United States Patent [19]
Young et al.

[11] 3,764,100
[45] Oct. 9, 1973

[54] COMPOUND-TWO-STAGE RESILIENT ISOLATION MOUNTING FOR USE IN ATTENUATING MECHANICAL VIBRATIONS

[75] Inventors: William I. Young, Elkridge; Robert J. Hanners, Edgewater, both of Md.

[73] Assignee: The United States of America as represented by the Secretary of the Navy, Washington, D.C.

[22] Filed: Dec. 27, 1971

[21] Appl. No.: 212,358

[52] U.S. Cl. .................................. 248/358 R
[51] Int. Cl. .................................. F16f 15/04
[58] Field of Search .......... 248/358, 9, 15, 22; 267/141, 153, 136, 137; 188/1 B

[56] References Cited
UNITED STATES PATENTS

| | | | |
|---|---|---|---|
| 2,926,881 | 3/1960 | Painter | 248/358 R |
| 2,295,829 | 9/1942 | Carlson | 248/358 R |
| 3,128,978 | 4/1964 | Sykes | 248/358 UX |
| 2,830,780 | 4/1958 | Schloss | 248/22 |

FOREIGN PATENTS OR APPLICATIONS

| 142,244 | 7/1951 | Australia | 188/1 B |
|---|---|---|---|

*Primary Examiner*—Roy D. Frazier
*Assistant Examiner*—Richard L. Stroup
*Attorney*—R. S. Sciascia et al.

[57] ABSTRACT

The invention is a resilient isolation mount to be used between vibrating objects and their supporting structures to reduce the transmitted vibration.

4 Claims, 4 Drawing Figures

COMPOUND-TWO-STAGE RESILIENT ISOLATION MOUNTING FOR USE IN ATTENUATING MECHANICAL VIBRATIONS

The invention described herein may be manufactured and used by or for the Government of the United States of America for Governmental purposes without the payment of any royalties thereon or therefor.

BACKGROUND OF THE INVENTION

Old methods of attenuating mechanical vibrations consist almost exclusively of the use of simple, or one-stage resilient mounts. While these mounts exist in a great variety of materials and constructions, they are inherently no better in performance than an "ideal" spring. If a greater degree of isolation is desired, the designer must use simple mounts with lower spring constants. However, lowering the spring constant results in a more flexibly mounted system, so that the stability considerations and permissable mount excursions place a practical limit on lowering the spring constant and hence on the performance attainable.

SUMMARY OF THE INVENTION

The invention is a compound mount having a seismic mass and resilient elements arranged in a "balanced" configuration; i.e., one in which the elastic center of the mount coincides with the center of gravity of the seismic mass-desirable for decoupling the remaining five modes of vibration of the seismic mass from the mode of exitation as well as minimizing shock excursions.

OBJECTS OF THE INVENTION

It is a primary object of the instant invention to achieve a more efficient vibration isolator than is possible with simple (one-stage) resilient mounts.

It is a further object of the instant invention to provide a mount with a transverse spring rate no greater than the axial spring rate.

It is yet another object of the instant invention to provide a mount which is self-snubbing or captive such that if the mount should be subjected to extreme forces, the mount would be restrained by metal rather than by the resilient portion of the mount.

DESCRIPTION OF THE PREFERRED EMBODIMENT

Figure 2:
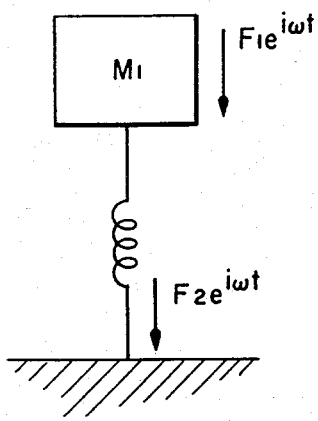
FIGS. 2 and 3 are schematic representations of simple and compound mounting systems
Figure 3:
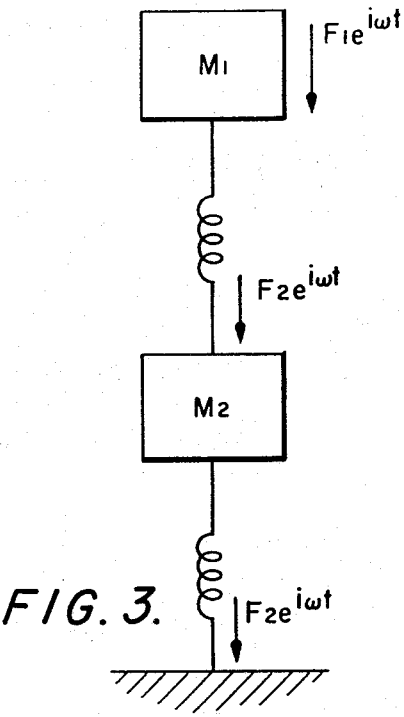
Figure 4:
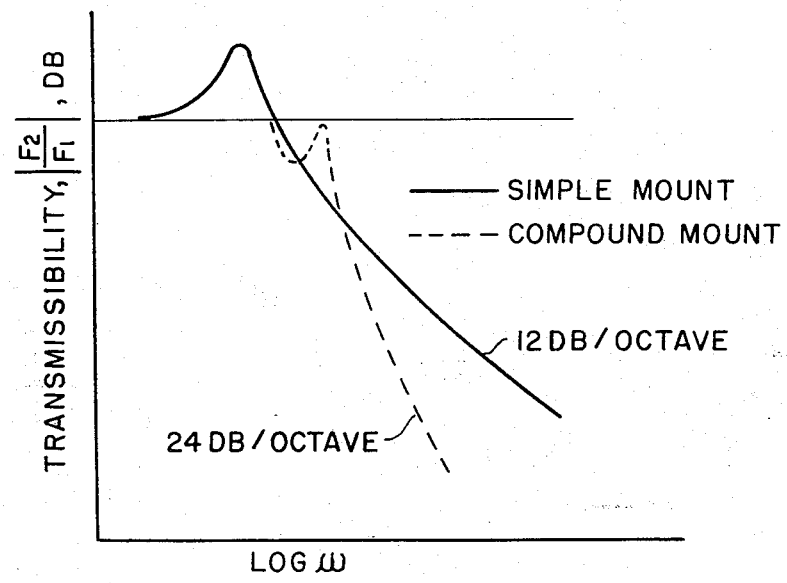
FIG. 4 shows typical transmissibility curves for simple and compound mounting systems having the same fundamental natural frequency.

The principles and theory of the compound mount are well known and likewise its superior isolation ability compared to a simple mounting of comparable fundamental natural frequency. One indicator of mount performance is the transmissibility (see FIGS. 2 and 3) which, for a mount attached to a rigid foundation and supporting a load, is the ratio of transmitted force to applied force, expressed as a logarithm. The performance of a simple mounting at best approaches that of an "idealized" spring, i.e., at frequencies well above the natural frequency, the transmissibility decreases at a rate of 12 decibels per octave change in exciting frequency. This compares with a rate of 24 decibels per octave for a compound mounting at frequencies above the secondary natural frequency (see FIG. 4). Thus, as the exciting frequency increases, the compound mount rapidly becomes a far more effective isolator than the simple mounting.

Figure 1:
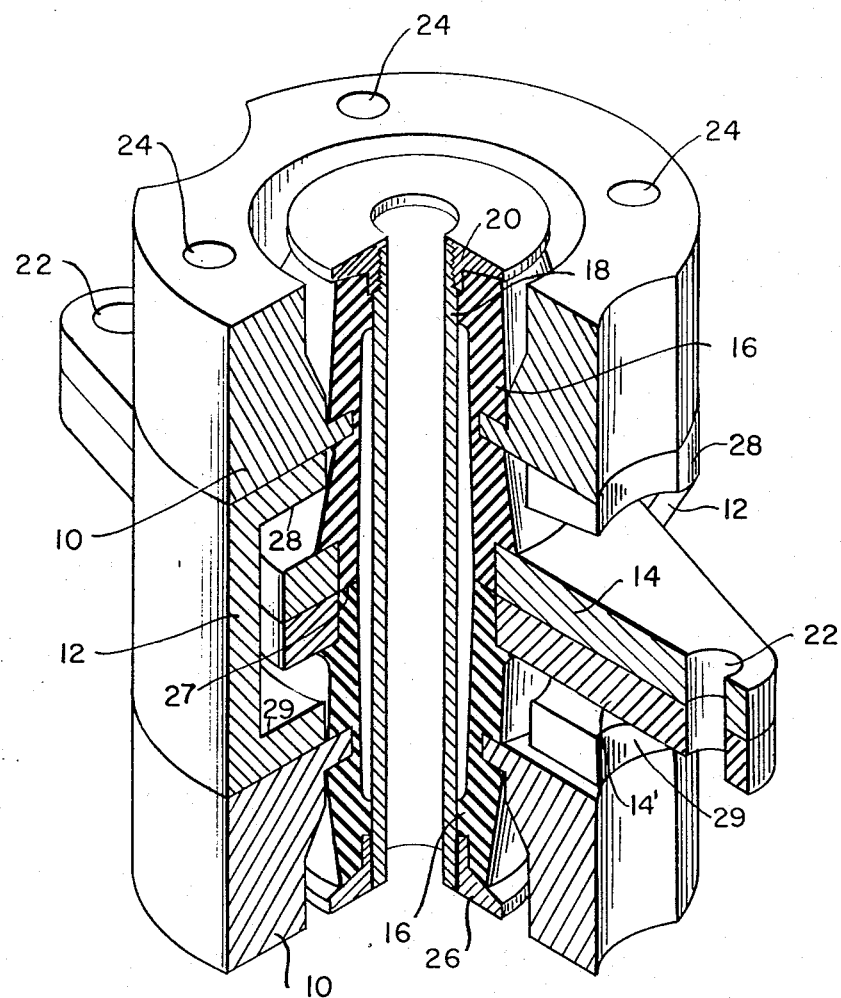
FIG. 1 shows the instant invention with a quarter-section removed.

Referring to FIG. 1, the invention is constructed in two identical sections, each consisting of a seismic mass 10, resilient element 16, and support plate or mounting means 14. To assemble, the sections are placed with their support plates 14 together and the seismic masses 10 are bolted together through the spacer yokes 12 via openings 24 to form a single rigid seismic mass. A preload or support means spool, consisting of tube 18, end cap 26, and threaded upper flange 20, is used to support the load. The spool is inserted through the resilient element 16 and the threaded upper flange 20 is screwed down to obtain a desired preload. As shown in FIG. 1, the resilient element 16 engages the preload spool only near the ends of the spool. This invention is then used in a manner identical to simple mountings. It is supported by the ears of the support plate 14 having holes 22 therein. The item to be isolated is carried by the preload spool with care taken to avoid contacting the seismic mass 10. As shown in FIG. 1, the first resilient element 16 engages the second resilient element 16' at their respective inner end faces at 27. Also as shown in the figure, each of a pair of spacer yokes has upper planar section 28 which engages substantially completely one side of the lower surface of the first seismic element 10 and a lower planar section 29 which engages substantially completely one side of the upper surface of the second seismic element 10'. The portion of the yokes between the upper and lower planar sections surround the plane of engagement of the support plates and resilient elements. As shown and described, the support plates are free to move upon deflection of the resilient elements but the plates would be confined by the yokes, seismic masses and bolts upon failure and destruction of the resilient means. The yokes are attached to the seismic masses by means of long bolts 24 which pass through the masses and the yoke.

The result is a unique arrangement of seismic mass with respect to the support plates which allows the mount to be balanced, i.e., the elastic center of the mount coincides with the center of gravity of the seismic mass, virtually decoupling all five remaining modes of vibration of the seismic mass from the mode of excitation. The mount is compact, having resilient elements concentrically within the seismic mass yet preserving access to the support plates thereby allowing a much more compact mount than could otherwise be achieved. The instant mount is captive, i.e., the spacer yokes make the seismic mass captive with respect to the load plate while the flanges of the preload spool restrain it with respect to the seismic mass, so that the entire mount is self-snubbing. Furthermore, the mount is symmetric about the plane of the support plate and so can be loaded from either direction along its central axis. It has a low radial stiffness for good isolation of vibrations in the radial direction. The mounting is in two symmetric halves so that a single mold could be used to manufacture as well as to permit disassembly for inspection or maintenance. The seismic mass is completely accessible so that mass can be added to or removed from it for purposes of changing its natural frequency.

The present invention may be constructed utilizing mild steel for the preload spool, seismic mass and support plates, and a neoprene rubber for the resilient elements. The use of alternative elastomers is not precluded.

It is understood that the invention is not limited to the exact details of construction shown and described for obvious modifications will occur to persons skilled in the art. It is therefore to be understood that within the scope of the appended claims the invention may be practiced otherwise than as specifically described.

What is claimed is:

1. A captive vibration isolation device, comprising:
   a first resilient element with an inner and an outer end face;
   a longitudinal bore through said first resilient element;
   a second resilient element substantially identical to said first resilient, said first and second resilient elements mutually engaged end to end to form a resilient unit symetrical about the plane of engagement;
   an end cap;
   a longitudinal preload spool within said bore, said spool having a first and second end, said first end being flared for fixed engagement with the outer end of said second resilient element, said preload spool end being threaded to engage said end cap;
   a first seismic mass attached to said first resilient element;
   a second seismic mass attached to said second resilient element;
   a pair of spacer yokes rigidly engaging said first and second seismic masses to form a loose noncontacting enclosure surrounding the engaged ends of said first and second resilient elements;
   a first support plate engaging said first resilient element and partially within said spacer yokes; and,
   a second support plate substantially identical to said first support plate and mutually engaging said first support plate and engaging said second resilient element.

2. A captive vibration isolation device, as in claim 1, wherein:
   said resilient unit engages said preload spool only near the ends of said spool.

3. A device as in claim 1 wherein said seismic mass is concentrically mounted with respect to the longitudinal axis of the preload spool and symmetrically mounted with respect to said support plates.

4. A captive vibration device, comprising:
   a first and second resilient means to isolate a vibrating mechanical device;
   a preload spool means centrally located within each of said first and second resilient means for engagement with a vibrating mechanical device and capable of simultaneously longitudinally compressing said first and second resilient means;
   a first and second external seismic mass whose combined center of mass is located at the combined center of vibration of said first and second resilient means said first and second seismic mass engaging the surface of said first and second resilient element;
   a pair of spacer yoke means for separating and rigidly connecting said first and second seismic mass means; and
   a first and second support plate means for engaging the combined resilient means at its center to suspend a vibrating mechanical device.

* * * * *